(12) United States Patent
Satyavolu et al.

(10) Patent No.: US 8,211,236 B2
(45) Date of Patent: Jul. 3, 2012

(54) PROCESS FOR PREPARING STARCH SUSPENSIONS AND STARCH PASTES HAVING IMPROVED PURITY, AND STARCH PRODUCTS

(75) Inventors: Jagannadh V. Satyavolu, Cedar Rapids, IA (US); Kevin R. Anderson, Cedar Rapids, IA (US)

(73) Assignee: Cargill, Incorporated, Wayzata, MN (US)

( * ) Notice: Subject to any disclaimer, the term of this patent is extended or adjusted under 35 U.S.C. 154(b) by 692 days.

(21) Appl. No.: 11/914,515

(22) PCT Filed: May 18, 2006

(86) PCT No.: PCT/US2006/019287
§ 371 (c)(1),
(2), (4) Date: Mar. 12, 2009

(87) PCT Pub. No.: WO2006/125104
PCT Pub. Date: Nov. 23, 2006

(65) Prior Publication Data
US 2009/0214754 A1    Aug. 27, 2009

Related U.S. Application Data

(60) Provisional application No. 60/682,116, filed on May 18, 2005.

(51) Int. Cl.
*C08B 30/00* (2006.01)

(52) U.S. Cl. .......................................... 127/71
(58) Field of Classification Search .................. None
See application file for complete search history.

(56) References Cited

U.S. PATENT DOCUMENTS

| 2,182,251 A | 12/1939 | Crickmer et al. |
| 2,525,430 A | 10/1950 | Smith |
| 3,868,355 A | 2/1975 | Rodgers |
| 5,756,721 A * | 5/1998 | Eden et al. ................ 536/127 |
| 2003/0049366 A1 * | 3/2003 | Koxholt et al. ............ 426/661 |

FOREIGN PATENT DOCUMENTS

| DE | 4428933 | 2/1996 |
| EP | 1291361 | 3/2003 |
| FR | 1537770 | 8/1968 |

OTHER PUBLICATIONS

International Search Report; PCT Application No. PCT/US2006/019287; Applicant: Cargill, Inc.; Date of Mailing: Sep. 26, 2006; 2 pages.

* cited by examiner

*Primary Examiner* — Melvin C Mayes
*Assistant Examiner* — Stefanie Cohen
(74) *Attorney, Agent, or Firm* — Perkins Coie LLP; Joseph P. Hamilton

(57) ABSTRACT

In this disclosure there are provided processes for improving purity of starch suspensions and starch pastes. Also provided in the disclosure are starch products having improved purity.

44 Claims, No Drawings

PROCESS FOR PREPARING STARCH SUSPENSIONS AND STARCH PASTES HAVING IMPROVED PURITY, AND STARCH PRODUCTS

CROSS REFERENCE TO RELATED APPLICATIONS

The present application is a U.S. National Phase application of International Application Ser. No. PCT/US2006/019287, filed May 18, 2006, which claims the benefit of U.S. Provisional Application Ser. No. 60/682,116, filed May 18, 2005, the disclosures of which are incorporated herein by reference in their entirety.

FIELD OF THE DISCLOSURE

The present disclosure relates to providing starch suspensions and starch pastes having improved purity, and starch products having improved purity.

BACKGROUND OF THE DISCLOSURE

It is well known to purify starch obtained from conventional corn wet milling processes. For example, starch is purified by washing with water in countercurrent fashion using hydrocyclones. Typically, the purified starch is expected to contain 0.30-0.35% total protein. More details regarding this type of purification are found in Corn Chemistry and Technology, Watson and Ramstad, International Standard Book Number: 0-913250-48-1, pages 385-386.

There is a continuing desire to provide improved methods for purification of starch suspensions and/or starch pastes.

SUMMARY OF THE DISCLOSURE

The present disclosure relates to processes for preparing starch suspensions and/or starch pastes having improved purity. The processes comprise incorporating a component into the starch suspension and/or the starch paste that causes impurities to float to the surface of the starch suspension and/or starch paste, and removing the impurities from the starch suspension and/or starch paste. The component may be a gas such as air, a gas-releasing chemical, or a chemical that has a density of less than 1.0 g/cc. In one embodiment, the starch suspension and/or starch paste is pressurized by incorporating a gas such as air, under a first pressure, and then the starch suspension and/or starch paste is depressurized to a second pressure that is lower than the first pressure, thereby causing impurities to float to the surface of the starch suspension and/or starch paste, and impurities are then removed. The term impurity or impurities as used herein are defined as any substance dissolved or suspended which alters chemical and/or physical properties of the pure substance. Examples of impurities in the starch suspensions and/or starch pastes include, but are not limited to, protein, fine fiber, and methanol extractables.

The disclosure also relates to starch suspensions and/or starch pastes having improved purity. Furthermore, the disclosure relates to certain corn starch products having improved purity.

DETAILED DESCRIPTION OF THE DISCLOSURE

The present disclosure relates to processes for preparing starch suspensions and/or starch pastes having improved purity. In the present disclosure any starch may be used in preparing the starch suspension and/or starch pastes. For example, suitable sources of starch include dent corn starch, waxy corn starch, potato starch, tapioca starch, wheat starch, sago starch, rice starch, sorghum starch, sweet potato starch, and the like.

The processes comprise incorporating a component into the starch suspension and/or the starch paste that causes impurities to float to the surface of the starch suspension and/or starch paste, and removing the impurities from the starch suspension and/or starch paste. The component may be a gas such as air, a gas-releasing chemical, or a chemical that has a density of less than 1.0 g/cc. In one embodiment, the starch suspension and/or starch paste is pressurized by incorporating a gas such as air, under a first pressure, and then the starch suspension and/or starch paste is depressurized to a second pressure that is lower than the first pressure, thereby causing impurities to float to the surface of the starch suspension and /or starch paste, and impurities are then removed.

The disclosure also relates to starch suspensions and/or starch pastes having improved purity. Furthermore, the disclosure relates to certain corn starch products having improved purity. The term impurity or impurities as used herein are defined as any substance dissolved or suspended which alters chemical and/or physical properties of the pure substance. Examples of impurities in the starch suspensions and/or starch pastes include, but are not limited to, protein, fine fiber, and methanol extractables.

In more detail, the starch suspension that is treated to provide improved purity comprises an amount of from about 1% to about 45% by weight of starch solids. The suspension may be aqueous or non-aqueous.

The component that is incorporated into the starch suspension that causes impurities to float to the surface of the starch suspension includes any component that will cause flotation of impurities. The component may be incorporated into the starch suspension in any manner known in the art. For example, the component may be injected into the starch suspension under pressure.

Suitable for use as the component in the purification of the starch suspensions include, but are not limited to, a gas, a gas-releasing chemical, or a chemical that has a density of less than 1.0 g/cc. Suitable gases for use herein are air, oxygen, nitrogen, carbon dioxide, ozone, fluorine, chlorine, hydrogen, helium, neon, argon, krypton, xenon, radon, and mixtures thereof. Suitable gas-releasing chemicals for use herein are a salt of an inorganic carbonate, a salt of an inorganic percarbonate, a salt of an inorganic persulfate, a salt of an inorganic fluoride, a salt of an inorganic chloride, a salt of an inorganic chlorite, a salt of an inorganic chlorate, a salt of an inorganic perchlorate, an organic carbonate, an azide, a peroxide, a peracid, and mixtures thereof. Typically, the gas-releasing chemical may be metal salts of an inorganic carbonate such as sodium carbonate or calcium carbonate, or may be an organic carbonate such as ethylene carbonate or propylene carbonate. Suitable chemicals having a density of less than 1.0 g/cc are a hydrocarbon, such as an alkane, a fatty acid, a fatty ester, a polyether, and the like. Typical alkanes that are suitable are pentane, hexane, iso-hexane and the like. Typical fatty acids that are suitable are palmitic acid, oleic acid, linoleic acid, and the like. Typical fatty esters that are suitable are lipids, lecithins, vegetable oils, and the like. Typical polyethers include polymers of ethylene oxide, polymers of propylene oxide, polymers of butylene oxide, mixtures thereof, and the like.

In the present process for preparing a starch suspension having improved purity, the component is incorporated such that impurities float to the surface of the starch suspension. During flotation, floatable impurities are removed from a continuous liquid medium. In an embodiment where the component utilized is a gas such as air, during flotation, air is bubbled through a liquid containing impurities to float the impurities to a free surface. The floated impurities may then be skimmed from the surface and removed by any suitable means.

In an embodiment of the present process, the starch suspension is pressurized by incorporating a gas such as air under a first pressure, and then the starch suspension containing the gas is depressurized to a second pressure that is lower than the first pressure. This causes the impurities to be floated to the surface of the starch suspension, and the impurities may then be removed by any manner. In a further embodiment, the starch suspension may be pressurized to achieve saturation of the gas in the starch suspension and then the starch suspension is depressurized to a second pressure that is lower than the first pressure thereby causing the impurities to be floated to the surface of the starch suspension, after which the impurities are removed.

In a further embodiment, the component incorporated into the starch suspension is a chemical that has a density of less than 1.0 g/cc. In this instance, the resulting starch suspension that includes the chemical having a density of less than 1.0 g/cc may be pressurized by incorporating a gas such as air under a first pressure and then the starch suspension is depressurized to a second pressure that is lower than the first pressure, thereby causing the impurities to float to the surface of the starch suspension. The impurities are thereafter removed by any means.

In a further embodiment of the process for preparing the starch suspension having improved purity, any conventional additives may be incorporated as desired. Typical additives include acids, bases, detergents, surfactants, foaming agents, enzymes, and mixtures thereof. Suitable acids may include hydrochloric acid, sulfuric acid, phosphoric acid, and the like. Suitable bases may include sodium hydroxide, potassium hydroxide, sodium carbonate, magnesium carbonate, calcium carbonate, and the like. Suitable enzymes may include an alpha amylase, a protease, a phosphorylase, a lipase, and the like. The additives may be included for varying purposes, and may be incorporated in an amount ranging from about 0.001 to about 20 weight % on a dry basis. Preferably, the additives may be incorporated in an amount ranging from about 0.1 to about 10 weight % on a dry basis. For example, the floatability of the impurities is expected to be enhanced using foaming agents. It is preferred that the additives be incorporated in the process for improving the level of purification of the starch suspension where the component that causes impurities to float is a gas such as air.

The starch suspension that may be treated to improve purity comprises an amount of from about 1% to about 45% by weight of starch solids. It is preferred that the starch suspension comprise from about 20% to about 40% by weight of starch solids.

The component that is incorporated in the process for improving the level of purification of a starch suspension is utilized in an amount that causes impurities of the starch suspension to float to the surface of the starch suspension. When the component incorporated in the process is a gas, the amount of the component utilized ranges from about 0:001% to about 99.999% by volume of the starch suspension, and preferably from about 1% to about 99% by volume. When the component is a gas-releasing chemical, or a chemical that has a density of less than 1.0 g/cc, or a mixture thereof, the component is incorporated into the starch suspension in an amount ranging from about 0.001 to about 99.999 weight % on a dry basis, and preferably from about 1 to about 90 weight %.

The present disclosure also relates to starch products of improved purity resulting from the process utilized in treating the starch suspension to improve the level of purification.

In another embodiment the present disclosure relates to a corn starch product resulting from treating a starch suspension to improve the level of purification as described herein. The resulting corn starch product is characterized as comprising from about 0.001 to about 0.005 weight % fine fiber on a dry basis, and about 0.20 to about 0.30 weight % methanol extractables on a dry basis. Preferably, the corn starch product comprises about 0.004 weight % fine fiber, and about 0.28 weight % methanol extractables. In the purification processes where pH is about 6.0 it has been further found that corn starch products may be produced that have additionally reduced levels of protein. In such instances, the resulting corn starch products are characterized as comprising from about 0.20 to about 0.30 weight % protein on a dry basis, about 0.001 to about 0.005 weight % fine fiber on a dry basis, and about 0.20 to about 0.30 weight % methanol extractables on a dry basis. Preferably the corn starch product comprises about 0.25 weight % protein, about 0.004 weight % fine fiber, and about 0.28 weight % methanol extractables. The protein, fine fiber, and methanol extractables values are determined by the test procedures set forth herein.

The starch suspensions of the present disclosure having improved purity may be used for all of the purposes in which starch suspensions have previously been utilized. Exemplary of such applications in which the starch suspensions may be used include, food applications such as sauces, dressings, pie fillings, beverages, and the like, and industrial applications such as water treatment, papermaking, oil drilling, coatings such as paper coatings and paints, and the like.

In another embodiment the present disclosure relates to the treatment of a starch paste to enhance the purification level of the starch paste. In general, the process for enhancing purity of the starch paste comprises incorporating a component into the starch paste that causes impurities in the starch paste to float to the surface of the starch paste, and removing impurities from the starch paste, thereby providing a starch paste having an improved level of purity.

In the purification of the starch paste, there is utilized as the starch paste a starch paste comprising from about 1 to about 45 weight % starch on a dry basis. Preferably, the starch paste comprises from about 5 to about 30 weight % of starch. The starch paste may be aqueous or non-aqueous.

The starch paste utilized herein may be prepared using any manner known in the art. For example, a starch suspension is heated to the gelatinization point, typically above 80° C., for a period of time sufficient to generate a starch paste.

In the process for producing a starch paste of improved purity, a component is incorporated into the starch paste such that impurities in the starch paste are floated to the surface of the starch paste. The impurities are removed from the starch paste using any conventional technology, thereby providing a starch paste having an improved level of purity.

The component that is incorporated into the starch paste and that causes impurities in the starch paste to float to the surface of the starch paste includes any component that will cause flotation of impurities. The component may be incorporated into the starch paste in any manner known in the art. For example, the component may be injected into the starch paste under pressure.

Suitable for use as the component in the purification of the starch pastes include, but are not limited to, a gas, a gas-releasing chemical, or a chemical that has a density of less than 1.0 g/cc. Suitable gases for use herein are air, oxygen, nitrogen, carbon dioxide, ozone, fluorine, chlorine, hydrogen, helium, neon, argon, krypton, xenon, radon, and mixtures thereof. Suitable gas-releasing chemicals for use herein are a salt of an inorganic carbonate, a salt of an inorganic percarbonate, a salt of an inorganic persulfate, a salt of an inorganic fluoride, a salt of an inorganic chloride, a salt of an inorganic chlorite, a salt of an inorganic chlorate, a salt of an inorganic perchlorate, an organic carbonate, an azide, a peroxide, a peracid, and mixtures thereof. Typically, the gas-releasing chemical may be metal salts of an inorganic carbonate such as sodium carbonate or calcium carbonate, or may be an organic carbonate such as ethylene carbonate or propylene carbonate. Suitable chemicals having a density of less than 1.0 g/cc are a hydrocarbon, such as an alkane, a fatty acid, a fatty ester, a polyether, and the like. Suitable alkanes that may be used are pentane, hexane, iso-hexane and the like. Suitable fatty acids that may be used are palmitic acid, oleic acid, linoleic acid, and the like. Suitable fatty esters that may be used are lipids, lecithins, vegetable oils, and the like. Suitable polyethers include polymers of ethylene oxide, polymers of propylene oxide, polymers of butylene oxide, mixtures thereof, and the like.

In the present process for preparing a starch paste having improved purity, the component is incorporated such that impurities float to the surface of the starch paste. During flotation, floatable impurities are removed from a continuous liquid medium. In the instance where the component utilized is a gas such as air, during flotation, the gas is bubbled through a liquid containing impurities to float the impurities to a free surface. The floated impurities may then be skimmed from the surface and removed by any suitable means.

In an embodiment of the present process, the starch paste is pressurized by incorporating a gas such as air under a first pressure, and then the starch paste containing the gas is depressurized to a second pressure that is lower than the first pressure. This causes the impurities to be floated to the surface of the starch paste, and the impurities may then be removed by any manner. In a further embodiment, the starch paste may be pressurized to achieve saturation of the gas in the starch paste and then the starch paste is depressurized to a second pressure that is lower than the first pressure thereby causing the impurities to be floated to the surface of the starch paste, after which the impurities are removed.

In a further embodiment, the component incorporated into the starch paste is a chemical that has a density of less than 1.0 g/cc. In this instance, the resulting starch paste that includes the chemical having a density of less than 1.0 g/cc may be pressurized by incorporating a gas such as air under a first pressure and then the starch paste is depressurized to a second pressure that is lower than the first pressure, thereby causing the impurities to float to the surface of the starch paste. The impurities are thereafter removed by any means.

In a further embodiment, the component incorporated into the starch paste is a chemical that has a density of less than 1.0 g/cc. In this instance, the resulting starch paste that includes the chemical having a density of less than 1.0 g/cc may be pressurized by incorporating a gas such as air under a first pressure and then the starch paste is depressurized to a second pressure that is lower than the first pressure, thereby causing the impurities to float to the surface of the starch paste. The impurities are thereafter removed by any means.

In a further embodiment of the process for preparing a starch paste having improved purity, any conventional additives may be incorporated as desired. Suitable additives include acids, bases, detergents, surfactants, foaming agents, enzymes, and mixtures thereof. Suitable acids may include hydrochloric acid, sulfuric acid, phosphoric acid, and the like. Suitable bases may include sodium hydroxide, potassium hydroxide, sodium carbonate, magnesium carbonate, calcium carbonate, and the like. Suitable enzymes may include an alpha amylase, a protease, a phosphorylase, a lipase, and the like. The additives may be included for varying purposes, and may be incorporated in an amount ranging from about 0.001 to about 20 weight % on a dry basis. Preferably, the additives may be incorporated in an amount ranging from about 0.1 to about 10 weight % on a dry basis. For example, the floatability of the impurities is expected to be enhanced using foaming agents. It is preferred that the additives be incorporated in the process for providing the starch paste having improved purity where the component that causes impurities to float is a gas such as air.

The present disclosure also relates to starch paste products produced by the purification process of the present disclosure.

The starch pastes of the present disclosure having improved purity may be used for all of the purposes in which starch pastes have previously been utilized. Exemplary of such applications in which the starch pastes may be used include, food applications such as sauces, dressings, pie fillings, beverages, and the like, and industrial applications such as water treatment, papermaking, oil drilling, coatings such as paper coatings and paints, and the like.

The disclosure will be more readily understood by reference to the following examples. There are, of course, many other forms of the disclosure which will become obvious to one skilled in the art, once the invention has been fully disclosed, and it will accordingly be recognized that these examples are given for the purpose of illustration only, and are not to be construed as limiting the scope of this disclosure in any way.

EXAMPLES

Test Procedures
% Protein

The following method is used for determining the quantity of total protein in a starch suspension or a starch paste. In this method, a LECO Model FP-2000 nitrogen analyzer, available from LECO CORPORATION, equipped with a balance, combustion boats with nickel liners, and printer is utilized.

The method was followed according to the manufacturer's instrument manual with the following exceptions: 1.5g of starch slurry was used in the % total protein determination.

% Fine Fiber

The following method is used for determining the quantity of fine fiber in a starch suspension.

1. Measure the Baume and temperature of 500 ml of starch suspension to find the dry starch content as expressed in terms of g dry substance (DS)/10 ml of starch suspension from the following table.

| Bé @ 100° F. | % DS | g DS/10 mL |
|---|---|---|
| 20.9 | 38.2 | 4.47 |
| 21.0 | 38.38 | 4.50 |
| 21.1 | 38.56 | 4.52 |
| 21.2 | 38.74 | 4.55 |
| 21.3 | 38.92 | 4.57 |
| 21.4 | 39.09 | 4.60 |
| 21.5 | 39.27 | 4.62 |
| 21.6 | 39.45 | 4.65 |
| 21.7 | 39.63 | 4.67 |

-continued

| Bé @ 100° F. | % DS | g DS/10 mL |
|---|---|---|
| 21.8 | 39.80 | 4.70 |
| 21.9 | 39.98 | 4.72 |
| 22.0 | 40.16 | 4.75 |
| 22.1 | 40.34 | 4.77 |
| 22.2 | 40.52 | 4.80 |
| 22.3 | 40.69 | 4.82 |
| 22.4 | 40.87 | 4.85 |
| 22.5 | 41.05 | 4.87 |
| 22.6 | 41.23 | 4.90 |
| 22.7 | 41.40 | 4.92 |
| 22.7 | 41.40 | 4.92 |
| 22.8 | 41.58 | 4.95 |
| 22.9 | 41.76 | 4.97 |
| 23.0 | 41.94 | 5.00 |
| 23.1 | 42.11 | 5.02 |
| 23.2 | 42.29 | 5.05 |
| 23.3 | 42.47 | 5.07 |
| 23.4 | 42.65 | 5.10 |
| 23.5 | 42.82 | 5.12 |
| 23.6 | 43.00 | 5.15 |
| 23.7 | 43.18 | 5.17 |
| 23.8 | 43.36 | 5.20 |
| 23.9 | 43.53 | 5.22 |
| 24.0 | 43.71 | 5.25 |
| 24.1 | 43.89 | 5.28 |
| 24.2 | 44.07 | 5.31 |
| 24.3 | 44.24 | 5.33 |
| 24.4 | 44.42 | 5.36 |
| 24.5 | 44.59 | 5.38 |

Temperature Correction

| Temp °F. | 70 | 76 | 82 | 88 | 94 | 100 | 106 | 112 | 118 | 124 | 130 |
|---|---|---|---|---|---|---|---|---|---|---|---|
| Baumé Adj | −0.5 | −0.4 | −0.3 | −0.2 | −0.1 | 0 | +0.1 | +0.2 | +0.3 | +0.4 | +0.5 |

2. Pour the 500 ml of starch suspension through a 325-mesh screen, washing thoroughly with a fine stream of water until no more material will pass through the screen.
3. Quantitatively transfer the material left on the screen (the fine fiber) to a dry tared evaporating dish, using a wash bottle with deionized water to rinse the material in the dish.
4. Dry the dish in a forced air oven at 100° C. for 4 hours or until the weight is constant.
5. Remove the dish from the oven and cool in a desiccator, and then reweigh the dish.

The quantity of fine fiber is calculated using the following equation:

$$\% \text{ Fine Fiber} = \frac{\text{Wt. of Fine Fiber} \times 2}{g\,DS\text{ Starch}/10\text{ ml}}$$

% Methanol Extractables

The following method is used for determining the quantity of methanol extractables in a starch. The extraction is used to determine methanol soluble impurities, such as fats and oils, in a starch. The method utilizes a soxlet extraction system manufactured by FOSS INSTRUMENTS, INC., SOXTEC SYSTEM 2045. The method was followed according to the manufacturer's instrument manual with the following exceptions: Methanol was used as the extraction solvent.

Example 1

Preparation of a Dent Corn Starch Suspension Having Improved Purity Using a Gas Component A dent corn starch suspension comprising about 34% starch solids was obtained from a corn milling operation. The starch suspension, having a pH of 3.6 was pumped into a Dissolved Air Flotation Unit Model-15 available from Komline-Sanderson, Inc. The DAF unit has a flotation area of about 13.5 square feet. The DAF unit's air dissolving system consists of a recirculation pump, a pressurized saturation tank, removal/collection mechanism for floated material, and other controls.

The starch suspension was pumped into the flotation area of the DAF unit at a rate of about 22 gallons per minute. When the suspension reached a height of about 30% level in the unit, the recirculation pump of the air dissolving system was started while continuing to introduce the starch suspension into the DAF unit. The recirculation pump was used to pump the starch suspension from the bottom of the flotation area into the pressurized saturation tank. The saturation tank pressure was maintained at about 60-70 pounds per square inch. Simultaneously, the air supply valve to the saturation tank was opened. The starch suspension in the saturation tank was maintained at a height of about 50% level in the tank. A recirculation rate of about 20 gallons per minute was maintained.

The recirculated starch suspension saturated with air was mixed with additional incoming starch suspension at the bottom of the flotation tank. The air bubbles released from the recirculated starch suspension caused impurities to rise to the top of the flotation tank. The starch suspension with reduced level of impurities flowed over an adjustable overflow weir. The impurities that floated to the top of the flotation area were skimmed using continuous skimmer blades, and the impurities were removed over a beaching plate into a discharge tank. The flow rate of the skimmer was about 1-2 gallons per minute.

The resulting starch suspension obtained by the process herein was then analyzed to determine the level of purity of the starch suspension. The level of impurities of the starch suspension prior to treatment by the process herein, and the level of impurities of the starch suspension after treatment are reported in Table 1.

TABLE 1

|  | Before DAF | After DAF | % Reduction |
|---|---|---|---|
| % Extractables | 0.49 | 0.28 | 43 |
| % Fine fiber | 0.025 | 0.004 | 84 |

From the above data it is observed that the starch suspension treated by the process herein is characterized by having a noticeable, reduction in the level of impurities.

Example 2

Preparation of a Dent Corn Starch Suspension Having Improved Purity Using a Gas Component and an Additive In this example there is disclosed the effect of incorporating an additive into the process for preparing a starch suspension having improved purity.

In this example the process of Example 1 was followed with the exception of adding 2% sodium hydroxide solution. The sodium hydroxide solution was added to the feed tank prior to pumping to the flotation unit. As a result of the addition of the sodium hydroxide the pH of the starch suspension was about 6.0. The resulting starch suspension was recovered from the DAF process and analyzed. The results are shown in Table 2.

TABLE 2

|  | Before DAF | After DAF | % Reduction |
|---|---|---|---|
| % Proteins | 0.35-0.379 | 0.25-0.28 | 26 |
| % Extractables | 0.49 | 0.28 | 43 |
| % Fine fiber | 0.025 | 0.004 | 84 |

From the above data it is observed that the level of purity of the starch suspension is even further enhanced. The data revealed that the level of extractables and fine fiber removed from the starch suspension are the same as in Example 1 and additionally, the level of proteins is also noticeably reduced.

Example 3

Preparation of a Starch Suspension with Improved Purity Using a Gas-Releasing Chemical Component In this example, there is provided a process for improving the purity of a starch suspension with a gas-releasing chemical component.

Hydroxyethyl corn starch is prepared by mixing 5000 g of an unmodified starch suspension at 35% starch solids to which 90 g of sodium sulfate is added. 5% sodium hydroxide solution is added to the stirring starch suspension dropwise, to achieve an 11.3 pH starch suspension. 50 g of ethylene oxide is added to the starch suspension and the suspension is heated to 40° C. for a period of 14 hours in a sealed vessel. To the reacted ethylene oxide starch suspension is then added 20% sulfuric acid to provide a pH of 1.0. The acidified starch suspension is reacted for 10 hours providing the hydroxyethyl corn starch.

20% sodium carbonate is added dropwise to the starch suspension. The addition of the sodium carbonate generates gaseous carbon dioxide in the acidified starch suspension. The gaseous carbon dioxide facilitates the flotation of the starch suspension impurities to the surface of the starch suspension. The floated impurities can then be removed from the starch suspension surface by skimming.

It is expected that the resultant starch suspension produced from the gas-releasing chemical flotation process will give a hydroxyethyl starch product of improved starch purity.

Example 4

Preparation of a Cooked Starch Paste with Improved Purity Using a Gas-Releasing Chemical Component In this example, there is provided a process for producing a cooked starch paste having improved purity using a gas-releasing chemical component.

The cooked starch paste used in this process is Cargill's FILM FLEX 70 hydroxyethyl starch. 1000 g of FILM FLEX 70 starch is dispersed in 5000 g water to achieve a starch solids level of 15%. The suspension is then heated, with agitation, to a temperature sufficient to achieve a gelatinized starch paste. 750 g of a 60% calcium carbonate suspension is added to the gelatinized starch paste, followed by 50 ml of 37% hydrochloric acid. The pH of the starch paste containing calcium carbonate is dropped to a pH that evolves gaseous carbon dioxide, which floats impurities to the starch paste surface. The impurities are then skimmed off the surface of the starch paste to give a purified starch paste. The starch paste containing residual calcium carbonate is then applied to a paper sheet. It is expected that the resultant pigmented sized paper sheet will have an improved surface for subsequent paper surface coating.

It should be clearly understood that the forms of the disclosure herein are illustrative only and are not intended to limit the scope of the disclosure. The present disclosure includes all modifications falling within the scope of the following claims.

What is claimed is:

1. A process for producing a second starch suspension having improved purity comprising:
   a. providing a first starch suspension,
   b. incorporating a component into the first starch suspension that causes impurities to float to the surface of the first starch suspension, and,
   c. removing impurities from the first starch suspension, thereby providing a second starch suspension having improved purity,
   wherein the impurities comprise protein, fine fiber, and methanol extractables,
   wherein the component is selected from the group consisting of a gas, a gas-releasing chemical, and a chemical that has a density less than 1.0 g/cc, and mixtures thereof.

2. The process according to claim 1, wherein the first starch suspension comprises an amount of from about 1% to about 45% by weight of starch solids.

3. The process according to claim 2, wherein the first starch suspension comprises an amount of from about 20% to about 40% by weight of starch solids.

4. The process according to claim 1, wherein the component is a gas selected from the group consisting of air, oxygen, nitrogen, carbon dioxide, ozone, fluorine, chlorine, hydrogen, helium, neon, argon, krypton, xenon, radon, and mixtures thereof.

5. The process according to claim 4, wherein the gas is selected from the group consisting of air, oxygen, nitrogen, carbon dioxide, and mixtures thereof.

6. The process according to claim 5, wherein the gas is air.

7. The process according to claim 1, wherein the component is a gas-releasing chemical selected from the group consisting of a salt of an inorganic carbonate, a salt of an inorganic percarbonate, a salt of an inorganic persulfate, a salt of an inorganic fluoride, a salt of an inorganic chloride, a salt of an inorganic chlorite, a salt of an inorganic chlorate, a salt of an inorganic perchlorate, an organic carbonate, an azide, a peroxide, a peracid, and mixtures thereof.

8. The process according to claim 7, wherein the gas-releasing chemical is selected from the group consisting of a salt of an inorganic carbonate, a salt of an inorganic chlorate, a peroxide, and mixtures thereof.

9. The process according to claim 1, wherein the component is a chemical that has a density less than 1.0 g/cc, and is a hydrocarbon.

10. The process according to claim 9, wherein the hydrocarbon is selected from the group consisting of an alkane, a fatty acid, a fatty ester, a polyether, and mixtures thereof.

11. The process according to claim 1, wherein the component is a gas and the gas is incorporated in an amount ranging from about 0.001% to about 99.999% by volume of the first starch suspension.

12. The process according to claim 11, wherein the amount ranges from about 1 to about 99% by volume of the first starch suspension.

13. The process according to claim 1, wherein the component is selected from the group consisting of a gas-releasing chemical, a chemical that has a density of less than 1.0 g/cc, and mixtures thereof, and the component is incorporated in an amount ranging from about 0.001 to about 99.999 weight % on a dry starch basis.

14. The process according to claim 13, wherein the component is incorporated in an amount ranging from about 1 to about 99 weight % on a dry starch basis.

15. The process according to claim 1, further comprising incorporating any conventional additive, prior to removal of impurities.

16. The process according to claim 15, wherein the additive is selected from the group consisting of an acid, a base, a detergent, a surfactant, a foaming agent, an enzyme, and mixtures thereof.

17. The process according to claim 1, wherein the component is a gas, and the first starch suspension is pressurized by incorporating the gas under a first pressure, and then the first starch suspension is depressurized to a second pressure that is lower than the first pressure, prior to removing impurities from the first starch suspension.

18. The process according to claim 17, wherein the gas is air.

19. The process according to claim 17, wherein the first starch suspension is pressurized to achieve saturation of the gas in the first starch suspension.

20. The process according to claim 1, wherein the component is a chemical that has a density less than 1.0 g/cc, and the resulting first starch suspension comprising the chemical having a density of less than 1.0 g/cc is pressurized by incorporating a gas under a first pressure, and then the first starch suspension comprising the chemical having a density of less than 1.0 g/cc is depressurized to a second pressure that is lower than the first pressure, prior to removing impurities from the first starch suspension.

21. The process according to claim 20, wherein the gas is air.

22. A corn starch product comprising from about 0.20 to about 0.30 weight % protein on a dry basis, about 0.001 to about 0.005 weight % fine fiber on a dry basis, and about 0.20 to about 0.30 weight % methanol extractables on a dry basis.

23. The corn starch product according to claim 22, wherein the content of protein is about 0.25 weight %, the content of fine fiber is about 0.004 weight %, and the content of methanol extractables is about 0.28 weight %.

24. A process for producing a second starch paste having improved purity comprising:
   a. providing a first starch paste,
   b. incorporating a component into the first starch paste that causes impurities to float to the surface of the first starch paste, and,
   c. removing impurities from the first starch paste, thereby providing a second starch paste having improved purity, wherein the impurities comprise protein, fine fiber, and methanol extractables,
   wherein the component is selected from the group consisting of a gas, a gas-releasing chemical, and a chemical that has a density less than 1.0 g/cc, and mixtures thereof.

25. The process according to claim 24, wherein the first starch paste comprises an amount of from about 1 to about 45 weight % starch on a dry basis.

26. The process according to claim 25, wherein the first starch paste comprises an amount of from about 20 to about 40 weight % starch on a dry basis.

27. The process according to claim 24, wherein the component is a gas selected from the group consisting of air, oxygen, nitrogen, carbon dioxide, ozone, fluorine, chlorine, hydrogen, helium, neon, argon, krypton, xenon, radon, and mixtures thereof.

28. The process according to claim 27, wherein the gas is selected from the group consisting of air, oxygen, nitrogen, carbon dioxide, and mixtures thereof.

29. The process according to claim 28, wherein the gas is air.

30. The process according to claim 24, wherein the component is a gas-releasing chemical selected from the group consisting of a salt of an inorganic carbonate, a salt of an inorganic percarbonate, a salt of an inorganic persulfate, a salt of an inorganic fluoride, a salt of an inorganic chloride, a salt of an inorganic chlorite, a salt of an inorganic chlorate, a salt of an inorganic perchlorate, an organic carbonate, an azide, a peroxide, a peracid, and mixtures thereof.

31. The process according to claim 30, wherein the gas-releasing chemical is selected from the group consisting of a salt of an inorganic carbonate, a salt of an inorganic chlorate, a peroxide, and mixtures thereof.

32. The process according to claim 24, wherein the component is a chemical that has a density less than 1.0 g/cc, and is a hydrocarbon.

33. The process according to claim 32, wherein the hydrocarbon is selected from the group consisting of an alkane, a fatty acid, a fatty ester, a polyether, and mixtures thereof.

34. The process according to claim 24, wherein the component is a gas and the gas is incorporated in an amount ranging from about 0.001% to about 99.999% by volume of the first starch paste.

35. The process according to claim 34, wherein the amount ranges from about 1% to about 99% by volume of the first starch paste.

36. The process according to claim 24, wherein the component is selected from the group consisting of a gas-releasing chemical, a chemical that has a density of less than 1.0 g/cc, and mixtures thereof, and the component is incorporated in an amount ranging from about 0.001 to about 99.999 weight % on a dry basis.

37. The process according to claim 36, wherein the amount ranges from about 1 to about 90 weight % on a dry basis.

38. The process according to claim 24, further comprising incorporating any conventional additive prior to removal of impurities.

39. The process according to claim 38, wherein the additive is selected from the group consisting of an acid, a base, a detergent, a surfactant, a foaming agent, an enzyme. and mixtures thereof.

40. The process according to claim 24, wherein the component is a gas, and the first starch paste is pressurized by incorporating the gas under a first pressure, and then the starch paste is depressurized to a second pressure that is lower than the first pressure, prior to removing impurities from the first starch paste.

41. The process according to claim 40, wherein the gas is air.

42. The process according to claim 40, wherein the first starch paste is pressurized to achieve saturation of the gas in the first starch paste.

43. The process according to claim 24, wherein the component is a chemical that has a density less than 1.0 g/cc, and the resulting first starch paste comprising the chemical having a density of less than 1.0 g/cc is pressurized by incorporating a gas under a first pressure, and then the first starch paste comprising the chemical having a density of less than 1.0 g/cc is depressurized to a second pressure that is lower than the first pressure, prior to removing impurities from the first starch paste.

44. The process according to claim 43, wherein the gas is air.

* * * * *